United States Patent
You

(10) Patent No.: US 11,109,264 B2
(45) Date of Patent: Aug. 31, 2021

(54) CONFIGURING QUALITY OF SERVICE (QOS) MAPPING RELATIONSHIP FLEXIBLY TO IMPROVE AN EFFICIENCY IN DATA TRANSMISSION

(71) Applicant: GUANGDONG OPPO MOBILE TELECOMMUNICATIONS CORP., LTD., Guangdong (CN)

(72) Inventor: Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 66 days.

(21) Appl. No.: 16/716,294

(22) Filed: Dec. 16, 2019

(65) Prior Publication Data

US 2020/0120539 A1    Apr. 16, 2020

Related U.S. Application Data

(63) Continuation of application No. PCT/CN2017/107773, filed on Oct. 26, 2017.

(51) Int. Cl.
*H04W 28/02* (2009.01)
*H04W 76/27* (2018.01)

(52) U.S. Cl.
CPC ... *H04W 28/0268* (2013.01); *H04W 28/0263* (2013.01); *H04W 76/27* (2018.02)

(58) Field of Classification Search
CPC ............. H04W 28/0268; H04W 76/27; H04W 28/0263; H04W 28/0257; H04W 28/0252;
(Continued)

(56) References Cited

U.S. PATENT DOCUMENTS

| 2013/0010641 A1* | 1/2013 | Dinan ............... H04W 36/0072 370/254 |
| 2014/0233380 A1 | 8/2014 | Kim et al. |

(Continued)

FOREIGN PATENT DOCUMENTS

| CN | 103096314 A | 5/2013 |
| CN | 103209410 A | 7/2013 |

(Continued)

OTHER PUBLICATIONS

The Notice of Allowance of corresponding Chinese application No. 201780090266.1, dated Dec. 4, 2020.

(Continued)

*Primary Examiner* — Mewale A Ambaye
(74) *Attorney, Agent, or Firm* — Ladas & Parry, LLP

(57) ABSTRACT

Embodiments of the present disclosure relate to a data transmission method, a terminal device and a network device. The method includes: receiving a downlink data packet transmitted by a network device, where the downlink data packet includes an RQI; determining a working mode of the RQI, where the working mode of the RQI is used to determine an indication content of the RQI, the indication content includes whether a first mapping relationship and/or a second mapping relationship satisfies a reflective QoS mapping; determining the first mapping relationship and the second mapping relationship of an uplink data packet according to the working mode of the RQI and the RQI. The terminal device may determine, according to the RQI of only 1-bit, whether the first mapping relationship and the second mapping relationship of the uplink data packet to be transmitted to the network device satisfy the reflective QoS.

10 Claims, 3 Drawing Sheets

200

Transmitting a downlink data packet to a terminal device, where the downlink data packet includes an RQI — S210

Transmitting a working mode of the RQI to the terminal device, where the working mode of the RQI is used to determine an indication content of the RQI by the terminal device, the indication content includes whether a first mapping relationship and/or a second mapping relationship satisfies a reflective QoS mapping, enabling the terminal device to determine the first mapping relationship and the second mapping relationship of an uplink data packet according to the working mode of the RQI and the RQI — S220

(58) Field of Classification Search
CPC ... H04W 76/10; H04W 228/00; H04W 28/02; H04W 27/00; H04W 29/12018
See application file for complete search history.

(56) References Cited

U.S. PATENT DOCUMENTS

| | | | |
|---|---|---|---|
| 2015/0063101 A1 | 3/2015 | Touati et al. | |
| 2018/0324631 A1* | 11/2018 | Jheng | H04L 1/1887 |
| 2019/0097936 A1* | 3/2019 | Yang | H04W 12/033 |

FOREIGN PATENT DOCUMENTS

| | | |
|---|---|---|
| CN | 104902518 A | 9/2015 |
| WO | 2019080034 A1 | 5/2019 |

OTHER PUBLICATIONS

The First Office Action of corresponding Chinese application No. 201780090266.1 dated Jun. 5, 2020 with search report.
MediaTek Inc. 3GPP TSG-RAN WG2 #99bis R2-1710702, Separating AS and NAS RQI fields, published on Oct. 13, 2017.
Huawei et al. 3GPP TSG-RAN WG2#99bis Meeting R2-1710226, Further discussion SDAP Header Format, published on Oct. 13, 2017.
The EESR of corresponding European application No. 17929721.3, dated Jun. 29, 2020.
Convida Wireless: "SDAP Header Format", 3GPP Draft; R2-1707351 (SDAP Header Format), 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017 Jun. 26, 2017(Jun. 26, 2017), XP051301839.
Qualcomm Incorporated:"Enhancing Link Adaptation in HetNets", 3GPP Draft; R1-100703 Enhancing Link Adaptation in Hetnets, 3rd Generation Partnership Project (3GPP), Mobile Competence Centre; 650, Route Des Lucioles; F-06921 Sophia-Antipolis Cedex; France, vol. RAN WG1, No. Valencia, Spain; Jan. 18, 2010 Jan. 12, 2010(Jan. 12, 2010), XP050418287.
Nokia et al:"RQoS indication to UE", 3GPP Draft; R2-1707992 Reflective QoS Indication, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017 Aug. 20, 2017(Aug. 20, 2017), XP051317906.
Ericsson:"SDAP Header Format", 3GPP Draft; R2-1707159-SDAP Header Format, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017 Jun. 26, 2017(Jun. 16, 2017), XP051306849.
Oppo, . "R2-17010351, Discussion on single bit RQI, "3GPP TSG RAN WG2 #99-Bis,Prague, Czech Republic, Oct. 9-13, 2017.

* cited by examiner

CONFIGURING QUALITY OF SERVICE (QOS) MAPPING RELATIONSHIP FLEXIBLY TO IMPROVE AN EFFICIENCY IN DATA TRANSMISSION

CROSS-REFERENCE TO RELATED APPLICATIONS

This application is a continuation of International Application No. PCT/CN2017/107773, filed on Oct. 26, 2017, the disclosure of which is hereby incorporated by reference in its entirety.

TECHNICAL FIELD

The present disclosure relates to the field of communication technologies and, in particular, to a data transmission method, a terminal device and a network device.

BACKGROUND

A mapping relationship of quality of service (QoS) of new radio (NR) in a 5th generation (5G) system includes two parts: a non-access stratum (NAS) mapping and an access stratum (AS) mapping, where the NAS mapping may represent a mapping from an internet protocol (IP) flow to a QoS flow, and the AS mapping may represent a mapping from a QoS flow to a data radio bearer (DRB).

In the 3rd Generation Partnership Project (3GPP), it is specified that an activation or a deactivation of a NAS reflective QoS and an AS reflective QoS is indicated by a 1-bit reflective QoS indication (RQI), that is to say, when a terminal device (user experience, UE) receives a service data adaptation protocol (SDAP) data packet, it needs to determine the activation or the deactivation for both of the NAS reflective QoS and the AS reflective QoS according to the 1-bit RQI therein. However, the NAS reflective QoS and the AS reflective QoS are independent from each other, namely, it is very likely that when one of which is in an activated state, the other one is in a deactivated state, in this case, it's impossible for the UE to determine states of the both according to the RQI, or to further determine the AS mapping and the NAS mapping.

SUMMARY

The present disclosure provides a data transmission method, a terminal device and a network device, which configure a QoS mapping relationship flexibly, thus improving an efficiency in data transmission.

A first aspect provides a data transmission method, including: receiving a downlink data packet transmitted by a network device, where the downlink data packet includes an RQI; determining a working mode of the RQI, the working mode of the RQI is used to determine an indication content of the RQI, the indication content includes whether a first mapping relationship and/or a second mapping relationship satisfies a reflective QoS mapping, the first mapping relationship is a mapping relationship from an IP flow to a QoS flow, the second mapping relationship is a mapping relationship from a QoS flow to a DRB, where the first mapping relationship satisfies the reflective QoS mapping represents determining the first mapping relationship of the downlink data packet as the first mapping relationship of an uplink data packet, where the second mapping relationship satisfies the reflective QoS mapping represents determining the second mapping relationship of the downlink data packet as the second mapping relationship of an uplink data packet; and determining the first mapping relationship and the second mapping relationship of the uplink data packet according to the working mode of the RQI and the RQI.

Therefore, according to the data transmission method in the embodiments of the present disclosure, the terminal device may determine the working mode of the RQI, and may determine, according to the RQI of only 1-bit in the downlink data packet, whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

Combining the first aspect, in an implementation of the first aspect, the method further includes: transmitting the uplink data packet to the network device using a corresponding IP flow, QoS flow and DRB according to the first mapping relationship and the second mapping relationship of the uplink data packet.

Combining the first aspect and the above implementations, in another implementation of the first aspect, where the determining a working mode of the RQI includes: determining that the working mode of the RQI is a first working mode, the first working mode is used to indicate that the RQI represents whether the first mapping relationship satisfies the reflective QoS mapping.

Combining the first aspect and the above implementation, in another implementation of the first aspect, where the RQI is a first preset value, the determining the first mapping relationship and the second mapping relationship of the uplink data packet according to the working mode of the RQI and the RQI includes: determining that the first mapping relationship satisfies the reflective QoS mapping, and determining the first mapping relationship of the downlink data packet as the first mapping relationship of the uplink data packet.

In another implementation, the RQI may occupy 1 bit, the first preset value may be "1".

Combining the first aspect and the above implementation, in another implementation of the first aspect, where the RQI is a second preset value, the determining the first mapping relationship and the second mapping relationship of the uplink data packet according to the working mode of the RQI and the RQI includes: determining the first mapping relationship of the uplink data packet according to a preset rule, where the preset rule includes that the first mapping relationship satisfies a default mapping relationship or that the first mapping relationship remains unchanged, where the first mapping relationship remains unchanged includes determining the first mapping relationship of a preceding uplink data packet of the uplink data packet as the first mapping relationship of the uplink data packet.

In another implementation, the RQI may occupy 1 bit, the second preset value may be "0".

Combining the first aspect and the above implementations, in another implementation of the first aspect, where the determining a working mode of the RQI includes: determining that the working mode of the RQI is a second working mode, where the second working mode is used to indicate that the RQI represents whether the first mapping relationship and the second mapping relationship satisfy the reflective QoS mapping.

Combining the first aspect and the above implementation, in another implementation of the first aspect, where the RQI is a first preset value, the determining the first mapping relationship and the second mapping relationship of the uplink data packet according to the working mode of the RQI and the RQI includes: determining that the first mapping relationship and the second mapping relationship satisfy the reflective QoS mapping, determining the first mapping relationship of the downlink data packet as the first mapping relationship of the uplink data packet, and determining the second mapping relationship of the downlink data packet as the second mapping relationship of the uplink data packet.

In another implementation, the RQI may occupy 1 bit, the first preset value may be "1".

Combining the first aspect and the above implementation, in another implementation of the first aspect, where the RQI is a second preset value, the determining the first mapping relationship and the second mapping relationship of the uplink data packet according to the working mode of the RQI and the RQI includes: determining the first mapping relationship and the second mapping relationship of the uplink data packet according to a preset rule, where the preset rule includes that the first mapping relationship and the second mapping relationship satisfy a default mapping relationship or that the first mapping relationship and the second mapping relationship remain unchanged, where the first mapping relationship and the second mapping relationship remain unchanged includes determining the first mapping relationship of a preceding uplink data packet as the first mapping relationship of the uplink data packet, and determining the second mapping relationship of the preceding uplink data packet as the second mapping relationship of the uplink data packet.

In another implementation, the RQI may occupy 1 bit, the second preset value may be "0".

Combining the first aspect and the above implementations, in another implementation of the first aspect, the method further includes: receiving a first radio resource control (RRC) message transmitted by the network device; and determining the second mapping relationship of the uplink data packet according to the first RRC message.

Combining the first aspect and the above implementations, in another implementation of the first aspect, the method further including: receiving a second RRC message transmitted by the network device, where the second RRC message includes an indication field; determining that the working mode of the RQI is a first working mode when the indication field is a first value; and determining that the working mode of the RQI is a second working mode when the indication field is a second value.

Therefore, according to the data transmission method in the embodiments of the present disclosure, the terminal device may determine the working mode of the RQI, and may determine, according to the RQI of only 1-bit in the downlink data packet, whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

A second aspect provides a data transmission method, including: transmitting a downlink data packet to a terminal device, where the downlink data packet includes an RQI; transmitting a working mode of the RQI to the terminal device, the working mode of the RQI is used to determine an indication content of the RQI by the terminal device, the indication content includes whether a first mapping relationship and/or a second mapping relationship satisfies a reflective QoS mapping, enabling the terminal device to determine the first mapping relationship and the second mapping relationship of an uplink data packet according to the working mode of the RQI and the RQI, where the first mapping relationship is a mapping relationship from an IP flow to a QoS flow, and the second mapping relationship is a mapping relationship from a QoS flow to a DRB, where the first mapping relationship satisfies the reflective QoS mapping indicates a determination of the first mapping relationship of the downlink data packet as the first mapping relationship of an uplink data packet by the terminal device, where the second mapping relationship satisfies the reflective QoS mapping indicates a determination of the second mapping relationship of the downlink data packet as the second mapping relationship of an uplink data packet by the terminal device.

Therefore, according to the data transmission method in the embodiments of the present disclosure, the network device may configure the working mode of the RQI for the terminal device, and by transmitting the downlink data packet including the RQI of only 1-bit to the terminal device, enable the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

Combining the second aspect, in an implementation of the second aspect, the method further includes: receiving the uplink data packet transmitted according to the first mapping relationship and the second mapping relationship of the uplink data packet by the terminal device.

Combining the second aspect and the above implementations, in another implementation of the second aspect, where the working mode of the RQI is a first working mode, the first working mode is used to indicate that the RQI represents whether the first mapping relationship satisfies the reflective QoS mapping.

Combining the second aspect and the above implementation, in another implementation of the second aspect, where the RQI is a first preset value, and the first working mode and the first preset value are used to indicate that the first mapping relationship of the uplink data packet of the terminal device satisfies the reflective QoS mapping.

Combining the second aspect and the above implementation, in another implementation of the second aspect, where the RQI is a second preset value, the first working mode and the second preset value are used to indicate the terminal device to determine the first mapping relationship of the uplink data packet according to a preset rule, the preset rule includes that the first mapping relationship satisfies a default mapping relationship or that the first mapping relationship remains unchanged, where the first mapping relationship remains unchanged includes that a determination of the first mapping relationship of a preceding uplink data packet of the uplink data packet as the first mapping relationship of the uplink data packet by the terminal device.

Combining the second aspect and the above implementations, in another implementation of the second aspect, where the working mode of the RQI is a second working mode, and the second working mode is used to indicate that the RQI represents whether the first mapping relationship and the second mapping relationship satisfy the reflective QoS mapping.

Combining the second aspect and the above implementation, in another implementation of the second aspect, where the RQI is a first preset value, and the second working mode and the first preset value are used to indicate that the first mapping relationship and the second mapping relationship of the uplink data packet of the terminal device satisfy the reflective QoS mapping.

Combining the second aspect and the above implementation, in another implementation of the second aspect, where the RQI is a second preset value, the second working mode and the second preset value are used to indicate the terminal device to determine the first mapping relationship and the second mapping relationship of the uplink data packet according to a preset rule, the preset rule includes that the first mapping relationship and the second mapping relationship satisfy a default mapping relationship or that the first mapping relationship and the second mapping relationship remain unchanged, where the first mapping relationship and the second mapping relationship remain unchanged includes a determination of the first mapping relationship of a preceding uplink data packet as the first mapping relationship of the uplink data packet, and a determination of the second mapping relationship of the preceding uplink data packet as the second mapping relationship of the uplink data packet.

Combining the second aspect and the above implementations, in another implementation of the second aspect, the method further includes: transmitting a first RRC message to the terminal device, where the first RRC message is used to indicate the second mapping relationship of the uplink data packet.

Combining the second aspect and the above implementations, in another implementation of the second aspect, the method further includes: transmitting a second RRC message to the terminal device, where the second RRC message includes an indication field, the indication field being a first value indicates that the working mode of the RQI is a first working mode, and the indication field being a second value indicates that the working mode of the RQI is a second working mode.

Therefore, according to the data transmission method in the embodiments of the present disclosure, the network device may configure the working mode of the RQI for the terminal device, and by transmitting the downlink data packet including the RQI of only 1-bit to the terminal device, enable the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

A third aspect provides a terminal device, which is configured to execute the method according to the first aspect or any possible implementations of the first aspect described above. Specifically, the terminal device includes units configured to execute the method according to the first aspect or any possible implementations of the first aspect described above.

A fourth aspect provides a network device, which is configured to execute the method according to the second aspect or any possible implementations of the second aspect described above. Specifically, the network device includes units configured to execute the method according to the second aspect or any possible implementations of the second aspect described above.

A fifth aspect provides a terminal device which includes: a memory unit and a processor, the memory unit is configured to store instructions, the processor is configured to execute the instructions stored in the memory, and when the processor executes the instructions stored in the memory, the processor is caused by the execution to carry out the method according to the first aspect or any possible implementations of the first aspect.

A sixth aspect provides a network device which includes: a memory unit and a processor, the memory unit is configured to store instructions, the processor is configured to execute the instructions stored in the memory, and when the processor executes the instructions stored in the memory, the processor is caused by the execution to carry out the method according to the second aspect or any possible implementations of the second aspect.

A seventh aspect provides a computer readable medium which is configured to store a computer program including instructions for carrying out the method according to the first aspect or any possible implementations of the first aspect.

An eighth aspect provides a computer readable medium which is configured to store a computer program including instructions for carrying out the method according to the second aspect or any possible implementations of the second aspect.

A ninth aspect provides a computer program product including computer program instructions, when a computer runs the instructions of the computer program product, the computer carries out the data transmission method according to the first aspect or any possible implementations of the first aspect. Specifically, the computer program product may be run over the terminal device according to the third aspect described above.

A tenth aspect provides a computer program product including computer program instructions, when a computer runs the instructions of the computer program product, the computer carries out the data transmission method according to the second aspect or any possible implementations of the second aspect. Specifically, the computer program product may be run over the network device according to the fourth aspect described above.

DESCRIPTION OF EMBODIMENTS

The technical solution of the present disclosure is hereinafter described with reference to the accompanying drawings in the embodiments of the present disclosure.

The embodiments of the present disclosure may be applied to various communication systems, such as a Global System of Mobile Communication (GSMC) system, a Code Division Multiple Access (CDMA) system, a Wideband Code Division Multiple Access (WCDMA) system, a General Packet Radio Service (GPRS), Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a future 5G system or NR, etc.

The terminal device in the embodiments of the present disclosure may refer to a user equipment, an access terminal, a user unit, a user station, a mobile station, a remote station, a remote terminal, a mobile device, a user terminal, a terminal, a wireless communication device, a user proxy or a user device. The terminal device may also be a cellular telephone, a wireless telephone, a Session Initiation Protocol (SIP) telephone, a Wireless Local Loop (WLL) station, a Personal Digital Assistant (PDA), a handheld device or a computing device with wireless communication functionality, or other processing devices connected to a wireless modem, or a car borne device, a wearable device, a terminal device in future 5G network, a terminal device in a future evolved Public Land Mobile Network (PLMN) or the like, which is not limited in the embodiments of the present disclosure.

The network device in the embodiments of the present disclosure may be a device configured to communicate with a terminal device, the network device may be a Base Transceiver Station (BTS) in a GSMC system or CDMA, a NodeB (NB) in a WCDMA system, an evolutional NodeB (eNB or eNodeB), a wireless controller in a Cloud Radio Access Network (CRAN) application, or the network device may be a relay station, an access point, a car borne device, a wearable device, a network device in future 5G network, a network device in a future evolved PLMN or the like, which is not limited in the embodiments of the present disclosure.

Figure 1:
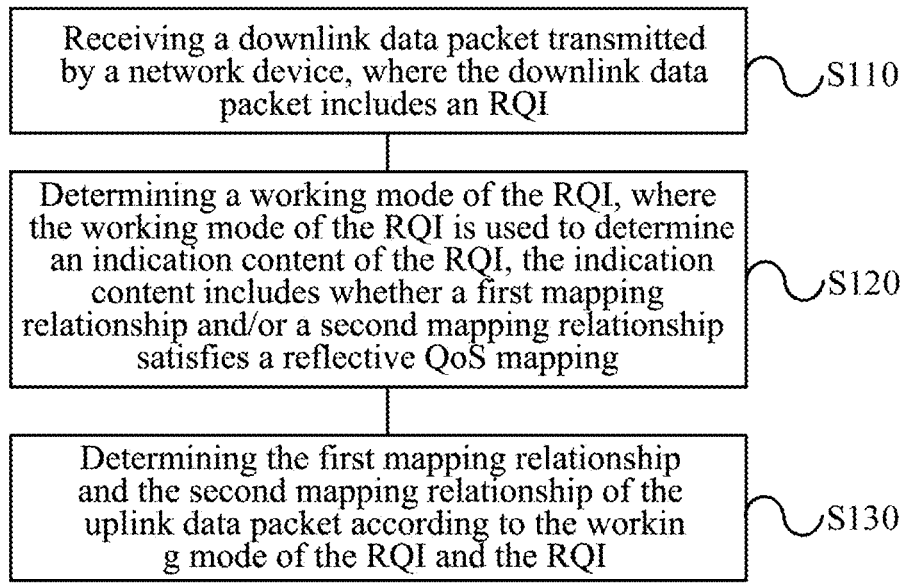
FIG. 1 is a schematic flowchart of a data transmission method according to an embodiment of the present disclosure.

FIG. 1 is a schematic flowchart of a data transmission method according to an embodiment of the present disclosure, the method 100 may be executed by a terminal device. As shown in FIG. 1, the method 100 includes: S110, receiving a downlink data packet transmitted by a network device, where the downlink data packet includes an RQI; S120, determining a working mode of the RQI, where the working mode of the RQI is used to determine an indication content of the RQI, the indication content includes whether a first mapping relationship and/or a second mapping relationship satisfies a reflective QoS mapping, the first mapping relationship is a mapping relationship from an IP flow to a QoS flow, the second mapping relationship is a mapping relationship from a QoS flow to a DRB, where the first mapping relationship satisfies the reflective QoS mapping represents determining the first mapping relationship of the downlink data packet as the first mapping relationship of an uplink data packet, where the second mapping relationship satisfies the reflective QoS mapping represents determining the second mapping relationship of the downlink data packet as the second mapping relationship of an uplink data packet; S130, determining the first mapping relationship and the second mapping relationship of the uplink data packet according to the working mode of the RQI and the RQI.

It should be understood that, the first mapping relationship may be a NAS mapping, that is, the first mapping relationship may represent a mapping from an IP flow to a QoS flow, the second mapping relationship may be an AS mapping, that is, the second mapping relationship may represent a mapping from a QoS flow to a DRB. Specifically, the first mapping relationship indicates a mapping from an IP flow to a QoS flow, with respect to any data packet, a specific correspondence between each of the IP flows and each of the QoS flows within the data packet may be determined according to a mapping rule that the first mapping relationship satisfies, similarly, a specific correspondence between each of the QoS flows and each of the DRBs within the data packet may be determined according to a mapping rule that the second mapping relationship satisfies.

Specifically, the first mapping relationship and the second mapping relationship may map according to a certain mapping rule. For example, the first mapping relationship and the second mapping relationship may conform with reflective QoS, namely, the first mapping relationship and the second mapping relationship of the downlink data packet may be determined, and the first mapping relationship and the second mapping relationship of the downlink data packet may be determined as the first mapping relationship and the second mapping relationship of the uplink data packet respectively. In an implementation, if the first mapping relationship and/or the second mapping relationship conforms with the reflective QoS, then the first reflective QoS is in an active state, and/or the second reflective QoS is in an active state, otherwise, the first reflective QoS and the second reflective QoS are both in deactivated states.

In the embodiment of the present disclosure, the terminal device determines the working mode of the RQI, where the working mode of the RQI is used to determine an indication content of the RQI, and the indication content includes whether a first mapping relationship and/or a second mapping relationship satisfies a reflective QoS. Specifically, the working modes of the RQI may include a first working mode and a second working mode, the first working mode is used to indicate whether the first mapping relationship satisfies the reflective QoS, the second working mode is used to indicate whether the first mapping relationship and the second mapping relationship satisfy the reflective QoS.

As an embodiment, with respect to the first working mode, when the terminal device determines the working mode of the RQI is the first working mode, the terminal device receives a downlink data packet including an RQI transmitted by the network device, if the RQI is a first preset value, for example, the RQI is "1", which indicates that the first mapping relationship of an uplink data packet of the terminal device satisfies the reflective QoS; if the RQI is a second preset value, for example, the RQI is "0", which indicates that the first mapping relationship does not satisfy the reflective QoS, in an implementation, the first mapping relationship may be determined according to a preset rule.

Specifically, with respect to the first working mode, when the terminal device receives a downlink data packet including an RQI transmitted by the network device, and the RQI is the first preset value, for example, the RQI is "1", then the terminal device activates the reflective QoS of the first mapping relationship, and determines the first mapping relationship of the uplink data packet of the terminal device satisfies the reflective QoS, namely, the terminal device determines the first mapping relationship of the downlink data packet received as the first mapping relationship of the uplink data packet.

Specifically, with respect to the first working mode, when the terminal device receives a downlink data packet including an RQI transmitted by the network device, and the RQI is the second preset value, for example, the RQI is "0", then the terminal device deactivates the reflective QoS of the first mapping relationship, and determines the first mapping relationship of the uplink data packet according to a preset rule. Where the preset rule may be that the terminal device maintains the first mapping relationship unchanged, for example, the terminal device may determine the first mapping relationship of a preceding uplink data packet of the uplink data packet as the first mapping relationship of the uplink data packet; the preset rule may also be that the terminal device determines the first mapping relationship of the uplink data packet according to a default mapping rule, the default mapping rule may be, though not limited to in the embodiment of the application, pre-configured.

It should be understood that, in the first working mode, the RQI is simply used to indicate whether the first mapping relationship of the uplink data packet satisfies the reflective QoS, but with respect to the second mapping relationship of the uplink data packet, the RQI is subject to no limitation. In an implementation, the terminal device may determine the second mapping relationship of the uplink data packet according to an RRC message transmitted by the network device. Specifically, the terminal device may receive a first RRC message transmitted by the network device, the first RRC message includes a mapping rule of the second mapping relationship, the terminal device may determine the second mapping relationship of the uplink data packet according to the first RRC message.

As an embodiment, with respect to the second working mode, when the terminal device determines the working mode of the RQI is the second working mode, the terminal device receives a downlink data packet including an RQI transmitted by the network device, if the RQI is the first preset value, for example, the RQI is "1", which indicates both of the first mapping relationship and the second mapping relationship of an uplink data packet of the terminal device satisfy the reflective QoS; if the RQI is the second preset value, for example, the RQI is "0", which indicates neither of the first mapping relationship and the second mapping relationship satisfies the reflective QoS, in an implementation, the first mapping relationship and the second mapping relationship may be determined according to a preset rule. That is, in the second working mode, the RQI may be used to indicate whether the first mapping relationship and the second mapping relationship satisfy the reflective QoS.

Specifically, with respect to the second working mode, when the terminal device receives a downlink data packet including an RQI transmitted by the network device, and the RQI is the first preset value, for example, the RQI is "1", then the terminal device activates the reflective QoS of the first mapping relationship and the second mapping relationship, and determines both of the first mapping relationship and the second mapping relationship of the uplink data satisfy the reflective QoS, namely, the terminal device determines the first mapping relationship of the downlink data packet received as the first mapping relationship of the uplink data packet, and determines the second mapping relationship of the downlink data packet received as the second mapping relationship of the uplink data packet.

Specifically, with respect to the second working mode, when the terminal device receives a downlink data packet including an RQI transmitted by the network device, and the RQI is the second preset value, for example, the RQI is "0", then the terminal device deactivates the reflective QoS of the first mapping relationship and the second mapping relationship, and determines the first mapping relationship and the second mapping relationship of the uplink data packet according to a preset rule. Where the preset rule may be that the terminal device maintains the first mapping relationship and the second mapping relationship unchanged, for example, the terminal device may determine the first mapping relationship of a preceding uplink data packet of the uplink data packet as the first mapping relationship of the uplink data packet, and determine the second mapping relationship of the preceding uplink data packet as the second mapping relationship of the uplink data packet; the preset rule may also be that the terminal device determines the first mapping relationship and the second mapping relationship of the uplink data packet according to a default mapping rule, the default mapping rule may be, though not limited to in the embodiment of the application, pre-configured.

In an implementation, with respect to the second working mode, the RQI may indicate whether the first mapping relationship and the second mapping relationship satisfy the reflective QoS, where the second mapping relationship may be further determined according to an RRC message transmitted by the network device. Specifically, with respect to the second working mode, the terminal device may determine whether the second mapping relationship satisfies the reflective QoS according a value of the RQI, besides, the terminal device may also receive a first RRC message transmitted by the network device, the first RRC message includes a mapping rule of the second mapping relationship, then the terminal device may determine the second mapping relationship of the uplink data packet according to the first RRC message, rather than determining the second mapping relationship according to an indication of the RQI of the second working mode.

In the embodiment of the present disclosure, an SDAP layer of the terminal device may determine the working mode of the RQI according to a configuration message send by an RRC layer. Specifically, the terminal device may receive a second RRC message transmitted by the network device, and determine the working mode of the RQI according to the second RRC message. For example, receiving a second RRC message transmitted by the network device, the second RRC message may include an indication field, for example, the indication field may occupy 1 bit. When the indication field is a first value, for example, the indication field is "0", it may indicate the terminal device that the working mode of the RQI is the first working mode, when the indication field is a second value, for example, the indication field is "1", it may indicate the terminal device that, though not limited to in the embodiment of the present disclosure, the working mode of the RQI is the second working mode.

In the embodiment of the present disclosure, the terminal device determines the first mapping relationship and the second mapping relationship of an uplink data packet according to the RQI in a downlink data packet and the working mode of the RQI determined, and then may transmit the uplink data packet to the network device using the corresponding IP flow, QoS flow and DRB.

Therefore, according to the data transmission method in the embodiments of the present disclosure, the terminal device may determine the working mode of the RQI, and may determine, according to the RQI of only 1-bit in the downlink data packet, whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

With reference to FIG. 1, the data transmission method according to the embodiments of the present disclosure is described in detail from the terminal side in the foregoing, and with reference to FIG. 2, the data transmission method according to the embodiments of the present disclosure will be described from the network device side in the following.

Figure 2:
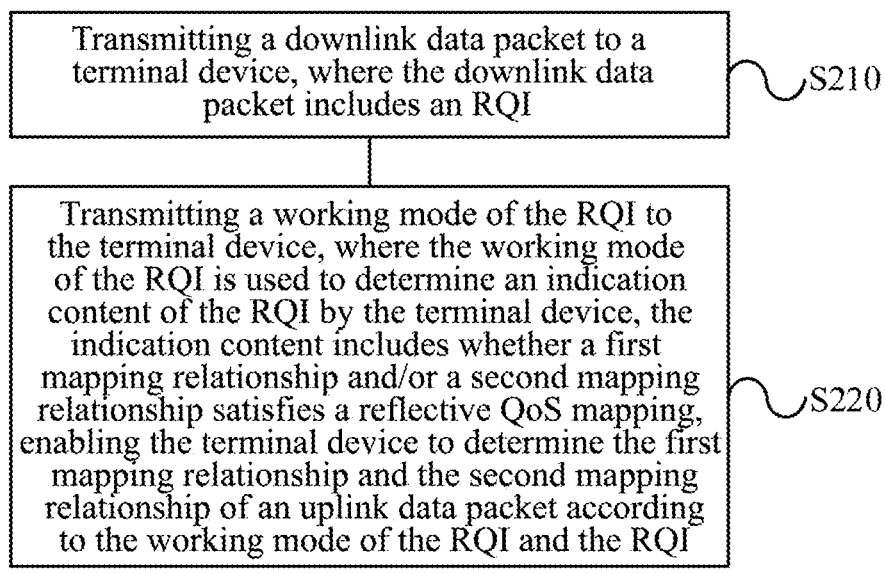
FIG. 2 is another schematic flowchart of a data transmission method according to an embodiment of the present disclosure.

FIG. 2 is a schematic flowchart of a data transmission method 200 according to an embodiment of the present disclosure, the method 200 may be executed by a network device. As shown in FIG. 2, the method 200 includes: S210, transmitting a downlink data packet to a terminal device, where the downlink data packet includes an RQI; S220, transmitting a working mode of the RQI to the terminal device, where the working mode of the RQI is used to determine an indication content of the RQI by the terminal device, the indication content includes whether a first mapping relationship and/or a second mapping relationship satisfies a reflective QoS mapping, enabling the terminal device to determine the first mapping relationship and the second mapping relationship of an uplink data packet according to the working mode of the RQI and the RQI, where the first mapping relationship is a mapping relationship from an IP flow to a QoS flow, and the second mapping relationship is a mapping relationship from a QoS flow to a DRB, where the first mapping relationship satisfies the reflective QoS mapping indicates a determination of the first mapping relationship of the downlink data packet as the first mapping relationship of an uplink data packet by the terminal device, where the second mapping relationship satisfies the reflective QoS mapping indicates a determination of the second mapping relationship of the downlink data packet as the second mapping relationship of an uplink data packet by the terminal device.

Therefore, according to the data transmission method in the embodiment of the present disclosure, the network device may configure the working mode of the RQI for the terminal device, and by transmitting the downlink data packet including the RQI of only 1-bit to the terminal device, enable the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

In an implementation, the method 200 further includes: receiving the uplink data packet transmitted according to the first mapping relationship and the second mapping relationship of the uplink data packet by the terminal device.

In an implementation, the working mode of the RQI is a first working mode, and the first working mode is used to indicate that the RQI represents whether the first mapping relationship satisfies the reflective QoS mapping.

In an implementation, the RQI is a first preset value, and the first working mode and the first preset value are used to indicate that the first mapping relationship of the uplink data packet of the terminal device satisfies the reflective QoS mapping.

In an implementation, the RQI is a second preset value, the first working mode and the second preset value are used to indicate the terminal device to determine the first mapping relationship of the uplink data packet according to a preset rule, the preset rule includes that the first mapping relationship satisfies a default mapping relationship or that the first mapping relationship remains unchanged, where the first mapping relationship remains unchanged includes a determination of the first mapping relationship of a preceding uplink data packet of the uplink data packet as the first mapping relationship of the uplink data packet by the terminal device.

In an implementation, the working mode of the RQI is a second working mode, and the second working mode is used to indicate that the RQI represents whether the first mapping relationship and the second mapping relationship satisfy the reflective QoS mapping.

In an implementation, the RQI is the first preset value, and the second working mode and the first preset value are used to indicate that the first mapping relationship and the second mapping relationship of the uplink data packet of the terminal device satisfy the reflective QoS mapping.

In an implementation, the RQI is the second preset value, the second working mode and the second preset value are used to indicate the terminal device to determine the first mapping relationship and the second mapping relationship of the uplink data packet according to a preset rule, the preset rule includes that the first mapping relationship and the second mapping relationship satisfy a default mapping relationship or that the first mapping relationship and the second mapping relationship remain unchanged, where the first mapping relationship and the second mapping relationship remain unchanged includes a determination of the first mapping relationship of a preceding uplink data packet as the first mapping relationship of the uplink data packet, and a determination of the second mapping relationship of the preceding uplink data packet as the second mapping relationship of the uplink data packet.

In an implementation, the method 200 further includes: transmitting a first RRC message to the terminal device, where the first RRC message is used to indicate the second mapping relationship of the uplink data packet.

In an implementation, the method 200 further includes: transmitting a second RRC message to the terminal device, where the second RRC message includes an indication field, the indication field being a first value indicates that the working mode of the RQI is a first working mode, and the indication field being a second value indicates that the working mode of the RQI is a second working mode It should be understood, the network device in the method 200 according to the embodiment of the present disclosure may correspond to the network device in the method 100, and the terminal device in the method 200 may correspond to the terminal device in the method 100, which will not be detailed herein.

Therefore, according to the data transmission method in the embodiment of the present disclosure, the network device may configure the working mode of the RQI for the terminal device, and by transmitting the downlink data packet including the RQI of only 1-bit to the terminal device, enable the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

It should be understood, in the various embodiments of the present disclosure, the sequential numbers of the respective processes do not mean an order for execution, the order for execution of the respective processes shall be determined by its functions and inner logic, the sequential numbers shall not be contemplated as any limitation to the process to carry out the embodiments of the present disclosure.

In addition, the term "and/or" herein is merely a description for the relationship between related objects, which indicates that three kinds of relationships may exist, for example, A and/or B, which may indicate three situations where A exists alone, both A and B exist, and B exists alone. Besides, the character "/" herein generally indicates that there is an "or" relationship between the related objects before and after.

With reference to FIG. 1 to FIG. 2, the data transmission method according to the embodiments of the present disclosure is described in detail in the foregoing, and the terminal device and the network device will be described in the following with reference to FIG. 3 to FIG. 6.

Figure 3:
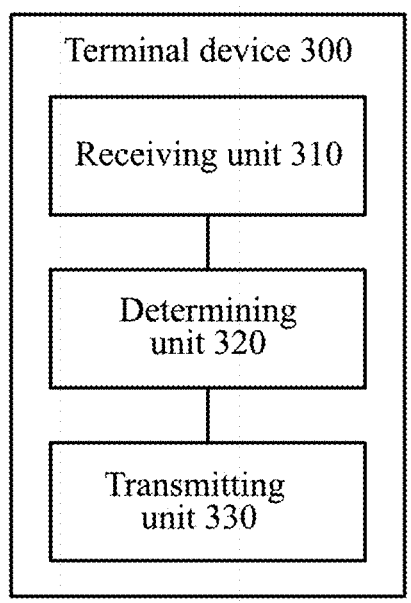
FIG. 3 is a schematic diagram of a terminal device according to an embodiment of the present disclosure.

As shown in FIG. 3, a terminal device 300 according to an embodiment of the present disclosure includes: a receiving unit 310 and a determining unit 320, in an implementation, may further include a transmitting unit 330.

Specifically, the receiving unit 310 is configured to: receive a downlink data packet transmitted by a network device, where the downlink data packet includes an RQI; and the determining unit 320 is configured to: determine a working mode of the RQI, the working mode of the RQI is used to determine an indication content of the RQI, the indication content includes whether a first mapping relationship and/or a second mapping relationship satisfies a reflective QoS mapping, the first mapping relationship is a mapping relationship from an IP flow to a QoS flow, the second mapping relationship is a mapping relationship from a QoS flow to a DRB, where the first mapping relationship satisfies the reflective QoS mapping represents determining the first mapping relationship of the downlink data packet as the first mapping relationship of an uplink data packet, where the second mapping relationship satisfies the reflective QoS mapping represents determining the second mapping relationship of the downlink data packet as the second mapping relationship of an uplink data packet; the determining unit 320 is further configured to: determine the first mapping relationship and the second mapping relationship of the uplink data packet according to the working mode of the RQI and the RQI.

Therefore, the terminal device according to the embodiment of the present disclosure may determine the working mode of the RQI, and determine, according to the RQI of only 1-bit in the downlink data packet, whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

In an implementation, the transmitting unit 330 is configured to: transmit the uplink data packet to the network device using a corresponding IP flow, QoS flow and DRB according to the first mapping relationship and the second mapping relationship of the uplink data packet.

In an implementation, the determining unit 320 is specifically configured to: determine that the working mode of the RQI is a first working mode, where the first working mode is used to indicate that the RQI represents whether the first mapping relationship satisfies the reflective QoS mapping.

In an implementation, the RQI is a first preset value, the determining unit 320 is specifically configured to: determine that the first mapping relationship satisfies the reflective QoS mapping, and determine the first mapping relationship of the downlink data packet as the first mapping relationship of the uplink data packet.

In an implementation, the RQI is a second preset value, the determining unit 320 is specifically configured to: determine the first mapping relationship of the uplink data packet according to a preset rule, where the preset rule includes that the first mapping relationship satisfies a default mapping relationship or that the first mapping relationship remains unchanged, where the first mapping relationship remains unchanged includes determining a first mapping relationship of a preceding uplink data packet of the uplink data packet as the first mapping relationship of the uplink data packet.

In an implementation, the determining unit 320 is specifically configured to: determine that the working mode of the RQI is a second working mode, where the second working mode is used to indicate that the RQI represents whether the first mapping relationship and the second mapping relationship satisfy the reflective QoS mapping.

In an implementation, the RQI is a first preset value, the determining unit 320 is specifically configured to: determine that the first mapping relationship and the second mapping relationship satisfy the reflective QoS mapping, determine the first mapping relationship of the downlink data packet as the first mapping relationship of the uplink data packet, and determine the second mapping relationship of the downlink data packet as the second mapping relationship of the uplink data packet.

In an implementation, the RQI is a second preset value, the determining unit 320 is specifically configured to: determine the first mapping relationship and the second mapping relationship of the uplink data packet according to a preset rule, where the preset rule includes that the first mapping relationship and the second mapping relationship satisfy a default mapping relationship or that the first mapping relationship and the second mapping relationship remain unchanged, where the first mapping relationship and the second mapping relationship remain unchanged includes determining the first mapping relationship of the preceding uplink data packet of the uplink data packet as the first mapping relationship of the uplink data packet, and determining the second mapping relationship of the preceding uplink data packet as the second mapping relationship of the uplink data packet.

In an implementation, the receiving unit 310 is further configured to: receive a first RRC message transmitted by the network device; the determining unit 320 is further configured to: determine the second mapping relationship of the uplink data packet according to the first RRC message.

In an implementation, the receiving unit 310 is further configured to: receive a second RRC message transmitted by the network device, where the second RRC message includes an indication field; the determining unit 320 is further configured to: determine that the working mode of the RQI is a first working mode when the indication field is a first value; and determine that the working mode of the RQI is a second working mode when the indication field is a second value.

It should be understood, the terminal device 300 according to the embodiments of the present disclosure may correspondingly execute the method 100 according to the embodiment of the present disclosure, and the above-mentioned and other operations and/or functions of the respective units in the terminal device 300 respectively implement the corresponding processes of the terminal device according to the respective methods illustrated in FIG. 1 to FIG. 2, which will not be repeated here for brevity.

Therefore, the terminal device according to the embodiment of the present disclosure, may determine the working mode of the RQI, and determine, according to the RQI of only 1-bit in the downlink data packet, whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

Figure 4:
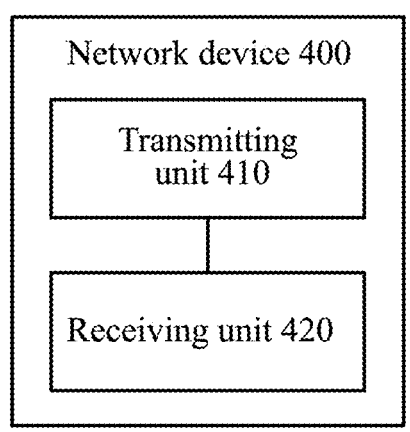
FIG. 4 is a second schematic diagram of a network device according to an embodiment of the present disclosure.

As shown in FIG. 4, a network device 400 according to an embodiment of the present disclosure includes: a transmitting unit 410, in an implementation, may further include a receiving unit 420.

Specifically, the transmitting unit 410 is configured to: transmit a downlink data packet to a terminal device, where the downlink data packet includes an RQI; the transmitting unit 410 is further configured to: transmit a working mode of the RQI to the terminal device, where the working mode of the RQI is used to determine an indication content of the RQI by the terminal device, the indication content includes whether a first mapping relationship and/or a second mapping relationship satisfies a reflective QoS mapping, enabling the terminal device to determine the first mapping relationship and the second mapping relationship of an uplink data packet according to the working mode of the RQI and the RQI, the first mapping relationship is a mapping relationship from an IP flow to a QoS flow, the second mapping relationship is a mapping relationship from a QoS flow to a DRB, where the first mapping relationship satisfies the reflective QoS mapping indicates a determination of the first mapping relationship of the downlink data packet as the first mapping relationship of an uplink data packet by the terminal device, where the second mapping relationship satisfies the reflective QoS mapping indicates a determination of the second mapping relationship of the downlink data packet as the second mapping relationship of an uplink data packet by the terminal device.

Therefore, the network device according to the embodiment of the present disclosure, by configuring the working mode of the RQI for the terminal device, and transmitting the downlink data packet including the RQI of only 1-bit to the terminal device, enables the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

In an implementation, the receiving unit 420 is configured to: receive the uplink data packet transmitted according to the first mapping relationship and the second mapping relationship of the uplink data packet by the terminal device.

In an implementation, the working mode of the RQI is a first working mode, and the first working mode is used to indicate that the RQI represents whether the first mapping relationship satisfies the reflective QoS mapping.

In an implementation, the RQI is a first preset value, and the first working mode and the first preset value are used to indicate that the first mapping relationship of the uplink data packet of the terminal device satisfies the reflective QoS mapping.

In an implementation, the RQI is a second preset value, the first working mode and the second preset value are used to indicate the terminal device to determine the first mapping relationship of the uplink data packet according to a preset rule, the preset rule includes that the first mapping relationship satisfies a default mapping relationship or that the first mapping relationship remains unchanged, where the first mapping relationship remains unchanged includes a determination of the first mapping relationship of a preceding uplink data packet of the uplink data packet as the first mapping relationship of the uplink data packet by the terminal device.

In an implementation, the working mode of the RQI is a second working mode, and the second working mode is used to indicate that the RQI represents whether the first mapping relationship and the second mapping relationship satisfy the reflective QoS mapping.

In an implementation, the RQI is a first preset value, and the second working mode and the first preset value are used to indicate that the first mapping relationship and the second mapping relationship of the uplink data packet of the terminal device satisfy the reflective QoS mapping.

In an implementation, the RQI is a second preset value, the second working mode and the second preset value are used to indicate the terminal device to determine the first mapping relationship and the second mapping relationship of the uplink data packet according to a preset rule, the preset rule includes that the first mapping relationship and the second mapping relationship satisfy a default mapping relationship or that the first mapping relationship and the second mapping relationship remain unchanged, where the first mapping relationship and the second mapping relationship remain unchanged includes a determination of the first mapping relationship of a preceding uplink data packet as the first mapping relationship of the uplink data packet, and a determination of the second mapping relationship of the preceding uplink data packet as the second mapping relationship of the uplink data packet.

In an implementation, the transmitting unit 410 is further configured to: transmit a first RRC message to the terminal device, where the first RRC message is used to indicate the second mapping relationship of the uplink data packet.

In an implementation, the transmitting unit 410 is further configured to: transmit a second RRC message to the terminal device, where the second RRC message includes an indication field, the indication field being a first value indicates that the working mode of the RQI is a first working mode, and the indication field being a second value indicates that the working mode of the RQI is a second working mode.

It should be understood, the network device 400 according to the embodiments of the present disclosure may correspondingly execute the method 200 according to the embodiment of the present disclosure, and the above-mentioned and other operations and/or functions of the respective units in the network device 400 respectively implement the corresponding processes of the network device according to the respective methods illustrated in FIG. 1 to FIG. 2, which will not be repeated here for brevity.

Therefore, the network device according to the embodiment of the present disclosure, by configuring the working mode of the RQI for the terminal device, and transmitting the downlink data packet including the RQI of only 1-bit to the terminal device, enables the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

Figure 5:
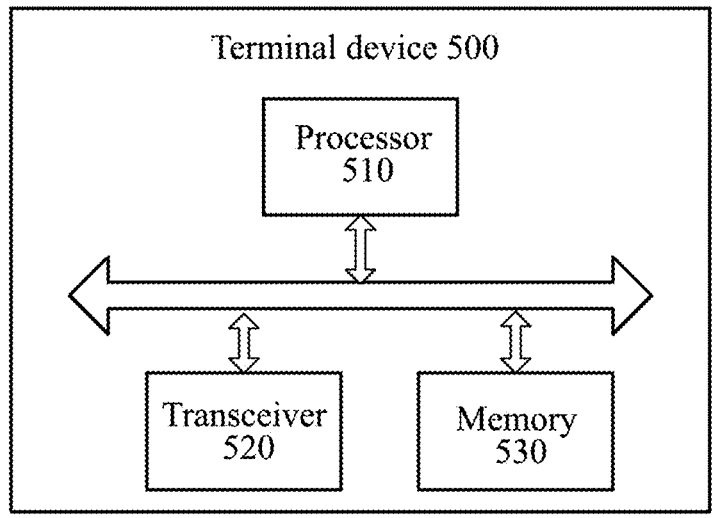
FIG. 5 is a schematic diagram of a terminal device according to an embodiment of the present disclosure.

FIG. 5 is a schematic diagram of a terminal device 500 according to an embodiment of the present disclosure, as shown in FIG. 5, the terminal device 500 includes: a processor 510 and a transceiver 520, the processor 510 and the transceiver 520 are connected, in an implementation, the terminal device 500 further includes a memory 530, the memory 530 and the processor 510 are connected. Where the processor 510, the memory 530 and the transceiver 520 communicate, transmit and/or control data signals with each other through internal connection paths, the memory 530 may be configured to store instructions, the processor 510 is configured to execute the instructions stored in the memory 530, to control the transceiver 520 to transmit information or signals, the transceiver 520 is configured to: receive a downlink data packet transmitted by a network device, where the downlink data packet includes an RQI; the processor 510 is configured to: determine a working mode of the RQI, where the working mode of the RQI is used to determine an indication content of the RQI, the indication content includes whether a first mapping relationship and/or a second mapping relationship satisfies a reflective QoS mapping, the first mapping relationship is a mapping relationship from an IP flow to a QoS flow, the second mapping relationship is a mapping relationship from a QoS flow to a DRB, where the first mapping relationship satisfies the reflective QoS mapping represents determining the first mapping relationship of the downlink data packet as the first mapping relationship of an uplink data packet, where the second mapping relationship satisfies the reflective QoS mapping represents determining the second mapping relationship of the downlink data packet as the second mapping relationship of an uplink data packet; and determine the first mapping relationship and the second mapping relationship of the uplink data packet according to the working mode of the RQI and the RQI.

Therefore, the terminal device according to the embodiment of the present disclosure, may determine the working mode of the RQI, and may determine, according to the RQI of only 1-bit in the downlink data packet, whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

As an embodiment, the transceiver 520 is configured to: transmit the uplink data packet to the network device using a corresponding IP flow, QoS flow and DRB according to the first mapping relationship and the second mapping relationship of the uplink data packet.

As an embodiment, the processor 510 is configured to: determine that the working mode of the RQI is a first working mode, where the first working mode is used to indicate that the RQI represents whether the first mapping relationship satisfies the reflective QoS mapping.

As an embodiment, the RQI is a first preset value, the processor 510 is configured to: determine that the first mapping relationship satisfies the reflective QoS mapping, and determine the first mapping relationship of the downlink data packet as the first mapping relationship of the uplink data packet.

As an embodiment, the RQI is a second preset value, the processor 510 is configured to: determine the first mapping relationship of the uplink data packet according to a preset rule, where the preset rule includes that the first mapping relationship satisfies a default mapping relationship or that the first mapping relationship remains unchanged, where the first mapping relationship remains unchanged includes determining a first mapping relationship of a preceding uplink data packet of the uplink data packet as the first mapping relationship of the uplink data packet.

As an embodiment, the processor 510 is configured to: determine that the working mode of the RQI is a second working mode, where the second working mode is used to indicate that the RQI represents whether the first mapping relationship and the second mapping relationship satisfy the reflective QoS mapping.

As an embodiment, the RQI is a first preset value, the processor 510 is configured to: determine that the first mapping relationship and the second mapping relationship satisfy the reflective QoS mapping, determine the first mapping relationship of the downlink data packet as the first mapping relationship of the uplink data packet, and determine the second mapping relationship of the downlink data packet as the second mapping relationship of the uplink data packet.

As an embodiment, the RQI is a second preset value, the processor 510 is configured to: determine the first mapping relationship and the second mapping relationship of the uplink data packet according to a preset rule, where the preset rule includes that the first mapping relationship and the second mapping relationship satisfy a default mapping relationship or that the first mapping relationship and the second mapping relationship remain unchanged, where the first mapping relationship and the second mapping relationship remain unchanged includes determining the first mapping relationship of the preceding uplink data packet of the uplink data packet as the first mapping relationship of the uplink data packet, and determining the second mapping relationship of the preceding uplink data packet as the second mapping relationship of the uplink data packet.

As an embodiment, the receiving unit 310 is further configured to: receive a first RRC message transmitted by the network device; the processor 510 is further configured to: determine the second mapping relationship of the uplink data packet according to the first RRC message.

As an embodiment, the receiving unit 310 is further configured to: receive a second RRC message transmitted by the network device, where the second RRC message includes an indication field; the processor 510 is further configured to: determine that the working mode of the RQI is a first working mode when the indication field is a first value; and determine that the working mode of the RQI is a second working mode when the indication field is a second value.

It should be understood, the terminal device 500 according to the embodiments of the present disclosure may correspond to the terminal device 300 according to the embodiment of the present disclosure, and may correspond to the corresponding subject that executes the method 100 according to the embodiment of the present disclosure, and the above-mentioned and other operations and/or functions of the respective units in the terminal device 500 respectively implement the corresponding processes of the terminal device according to the respective methods illustrated in FIG. 1 to FIG. 2, which will not be repeated here for brevity.

Therefore, the terminal device according to the embodiment of the present disclosure, may determine the working mode of the RQI, and determine, according to the RQI of only 1-bit in the downlink data packet, whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

Figure 6:
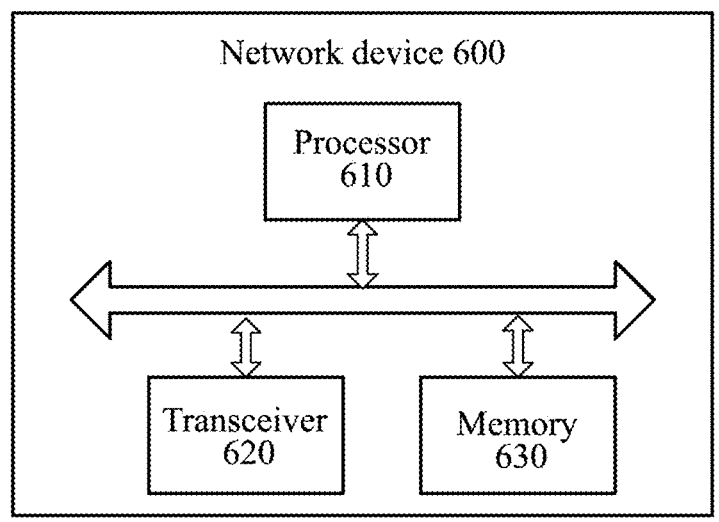
FIG. 6 is a second schematic diagram of a network device according to an embodiment of the present disclosure.

FIG. 6 is a schematic diagram of a network device 600 according to an embodiment of the present disclosure, as shown in FIG. 6, a network device 600 includes: a processor 610 and a transceiver 620, the processor 610 and the transceiver 620 are connected, in an implementation, the network device 600 further includes a memory 630, the memory 630 and the processor 610 are connected. Where the processor 610, the memory 630 and the transceiver 620 communicate, transmit and/or control data signals with each other through internal connection paths, the memory 630 may be configured to store instructions, the processor 610 is configured to execute the instructions stored in the memory 630, to control the transceiver 620 to transmit information or signals, the transceiver 620 is configured to: transmit a downlink data packet to a terminal device, where the downlink data packet includes an RQI; transmit a working mode of the RQI to the terminal device, where the working mode of the RQI is used to determine an indication content of the RQI by the terminal device, the indication content includes whether a first mapping relationship and/or a second mapping relationship satisfies a reflective QoS mapping, enabling the terminal device to determine the first mapping relationship and the second mapping relationship of an uplink data packet according to the working mode of the RQI and the RQI, the first mapping relationship is a mapping relationship from an IP flow to a QoS flow, the second mapping relationship is a mapping relationship from a QoS flow to a DRB, where the first mapping relationship satisfies the reflective QoS mapping indicates a determination of the first mapping relationship of the downlink data packet as the first mapping relationship of an uplink data packet by the terminal device, where the second mapping relationship satisfies the reflective QoS mapping indicates a determination of the second mapping relationship of the downlink data packet as the second mapping relationship of an uplink data packet by the terminal device.

Therefore, the network device according to the embodiment of the present disclosure, by configuring the working mode of the RQI for the terminal device, and transmitting the downlink data packet including the RQI of only 1-bit to the terminal device, enables the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

As an embodiment, the transceiver 620 is configured to: receive the uplink data packet transmitted according to the first mapping relationship and the second mapping relationship of the uplink data packet by the terminal device.

As an embodiment, the working mode of the RQI is a first working mode, the first working mode is used to indicate that the RQI represents whether the first mapping relationship satisfies the reflective QoS mapping.

As an embodiment, the RQI is a first preset value, and the first working mode and the first preset value are used to indicate that the first mapping relationship of the uplink data packet of the terminal device satisfies the reflective QoS mapping.

As an embodiment, the RQI is a second preset value, and the first working mode and the second preset value are used to indicate the terminal device to determine the first mapping relationship of the uplink data packet according to a preset rule, where the preset rule includes that the first mapping relationship satisfies a default mapping relationship or that the first mapping relationship remains unchanged, where the first mapping relationship remains unchanged includes a determination of the first mapping relationship of a preceding uplink data packet of the uplink data packet as the first mapping relationship of the uplink data packet by the terminal device.

As an embodiment, the working mode of the RQI is a second working mode, and the second working mode is used to indicate that the RQI represents whether the first mapping relationship and the second mapping relationship satisfy the reflective QoS mapping.

As an embodiment, the RQI is a first preset value, and the second working mode and the first preset value are used to indicate that the first mapping relationship and the second mapping relationship of the uplink data packet of the terminal device satisfy the reflective QoS mapping.

As an embodiment, the RQI is a second preset value, the second working mode and the second preset value are used to indicate the terminal device to determine the first mapping relationship and the second mapping relationship of the uplink data packet according to a preset rule, the preset rule includes that the first mapping relationship and the second mapping relationship satisfy a default mapping relationship or that the first mapping relationship and the second mapping relationship remain unchanged, where the first mapping relationship and the second mapping relationship remain unchanged includes a determination of the first mapping relationship of a preceding uplink data packet as the first mapping relationship of the uplink data packet, and a determination of the second mapping relationship of the preceding uplink data packet as the second mapping relationship of the uplink data packet.

As an embodiment, the transceiver 620 is configured to: transmit a first RRC message to the terminal device, where the first RRC message is used to indicate the second mapping relationship of the uplink data packet.

As an embodiment, the transceiver 620 is configured to: transmit a second RRC message to the terminal device, where the second RRC message includes an indication field, the indication field being a first value indicates that the working mode of the RQI is a first working mode, and the indication field being a second value indicates that the working mode of the RQI is a second working mode.

It should be understood, the network device 600 according to the embodiments of the present disclosure may correspond to the network device 400 according to the embodiment of the present disclosure, and may correspond to the corresponding subject that executes the method 200 according to the embodiment of the present disclosure, and the above-mentioned and other operations and/or functions of the respective units in the terminal device 600 respectively implement the corresponding processes of the terminal device according to the respective methods illustrated in FIG. 1 to FIG. 2, which will not be repeated here for brevity.

Therefore, the network device according to the embodiment of the present disclosure, by configuring the working mode of the RQI for the terminal device, and transmitting the downlink data packet including the RQI of only 1-bit to the terminal device, enables the terminal device to determine whether the first mapping relationship and the second mapping relationship of the uplink data packet to be transmitted to the network device satisfy the reflective QoS, such that states of the reflective QoS of the first mapping relationship and the second mapping relationship are independent from each other, thereby achieving flexible configuration of mapping rules of the first mapping relationship and the second mapping relationship.

It should be noted that the embodiments of the method described above may be applied to or implemented by a processor. The processor may be an integrated circuit chip with a signal processing capability. In terms of implementation, each of the steps of the method embodiments described above may be accomplished by an integrated logic circuit of the hardware in the processor or instructions in the form of software. The processor mentioned above may be a general purpose processor, a digital signal processor (DSP), a ready-made field programmable gate array (FPGA), an application specific integrated circuit (ASIC) or a further programmable logic device, a discrete gate or a transistor logic device, a discrete hardware component or the like, which implements or executes respective methods, steps and logic diagrams disclosed in the embodiments of the present disclosure. A general purpose processor may be a microprocessor, or may be any conventional processor or the like. The steps of the method disclosed in the embodiments of the present disclosure may be directly executed by a decoding processor with hardware, or executed by a decoding processor with a combination of hardware and software modules. A software module may be in a storage medium well-known in the art, such as a random access memory, a flash memory, a read-only memory, a programmable read-only memory, electrically erasable programmable memory and a register, the storage medium is integrated in a memory, the processor accesses the information in the memory and executes the steps of the methods described above in combination with its hardware.

It should be understood that the memory in the embodiments of the present disclosure may be a volatile memory or a non-volatile memory, or may include a volatile and a non-volatile memory both. Where the non-volatile memory may be a read-only memory (ROM), a programmable read only memory (PROM), an erasable programmable read only memory (EPROM), an electrically erasable programmable read only memory (EEPROM) or a flash memory. The volatile memory may be a random access memory (RAM) which serves as a high speed cache. As an exemplary explanation, but not limiting, many types of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), an synchronous link dynamic random access memory (SLDRAM), a direct Rambus random access memory (DR RAM) and the like. Note that the memory according to systems and methods described herein is intended to include, but not limited to, these and any other suitable types of memory.

Those ordinary skilled in the art appreciate, the respective units and algorithm steps described in the embodiments disclosed herein, may be implemented as electronic hardware or a combination of computer software and electronic hardware. Whether the functions are implemented with hardware or software depends on the specific application and design constraints of a technical solution. Professionals can use different methods for each specific application to implement the described functionality, but this kind of implementation should not be considered beyond the scope of the present disclosure.

Those ordinary skilled in the art clearly understand, for the convenience and brevity of description, the specific working process of a system, a device, and a unit described above may refer to the corresponding process in the foregoing method embodiments, which will not be repeated here.

In the several embodiments provided in the present disclosure, it should be understood that the disclosed system, device and method may be implemented in other manners. For example, the device embodiments described above are merely illustrative. For example, the partition of the unit is only a logical function partition. There may be other manners for partition in an actual implementation, for example, multiple units or components may be combined with or integrated into another system, or some features may be omitted or not executed. In addition, the mutual coupling or direct coupling or communication connection shown or discussed may be an indirect coupling or communication connection through some interfaces, devices or units, and may be electrical, mechanical or otherwise.

The units described as discrete components may or may not be physically separated, a component shown as a unit may or may not be a physical unit, namely, it may be located in one place, or may be distributed in multiple network elements. Some or all of the units may be selected according to actual needs to achieve the purpose of the embodiments of the solution.

In addition, respective functional units in the embodiments of the present disclosure may be integrated into a processing unit, or may exist separately physically, or two or more units may be integrated into one unit.

The functions may be stored in a computer readable storage medium if being implemented in the form of a software functional unit and sold or used as a standalone product. Based on such understanding, the technical solution of the present disclosure, substantively, or a part of which that makes a contribution to the prior art, or a part of which, may be embodied in the form of a software product which is stored in a storage medium, where a plurality of instructions are included to cause a computer (for example, a personal computer, server, a network device or the like) to execute all or part of the steps of the methods described in the embodiments of the present disclosure. The foregoing storage medium includes: a USB flash disk, a mobile hard disk drive, a read-only memory (ROM), a random access memory (RAM), a magnetic disk or an optical disk, or other medium that can store program codes.

The above description represents simply specific embodiments of the present disclosure, however, the protection scope of the present disclosure is not limited thereto, any modification or substitution, easily made by those ordinary skilled in the art based on the technical scope disclosed by the present disclosure, shall be encompassed within the protection scope of the present disclosure. Therefore, the protection scope of the present disclosure shall be subject to the protection scope of the claims.

What is claimed is:

1. A data transmission method, comprising:

receiving a downlink data packet transmitted by a network device, wherein the downlink data packet comprises a reflective quality of service indication (RQI);

determining a working mode of the RQI, wherein the working mode of the RQI is used to determine an indication content of the RQI, the indication content comprises whether at least one of a first mapping relationship and a second mapping relationship satisfies a reflective quality of service (QoS) mapping, the first mapping relationship is a mapping relationship from an Internet Protocol (IP) flow to a QoS flow, the second mapping relationship is a mapping relationship from the QoS flow to a data radio bearer (DRB), wherein the first mapping relationship satisfies the reflective QoS mapping represents determining to use the first mapping relationship of the downlink data packet as the first mapping relationship of an uplink data packet, wherein the second mapping relationship satisfies the reflective QoS mapping represents determining to use the second mapping relationship of the downlink data packet as the second mapping relationship of the uplink data packet; wherein the determining the working mode of the RQI comprises: determining that the working mode of the RQI is a second working mode, wherein the second working mode is used to indicate that the RQI represents whether the first mapping relationship and the second mapping relationship satisfy the reflective QoS mapping;

and determining the first mapping relationship and the second mapping relationship of the uplink data packet according to the working mode of the RQI and the RQI.

2. The method according to claim 1, further comprising:

transmitting the uplink data packet to the network device using a corresponding IP flow, QoS flow and DRB according to the first mapping relationship and the second mapping relationship of the uplink data packet.

3. The method according to claim 1, wherein the RQI is a first preset value, the determining the first mapping relationship and the second mapping relationship of the uplink data packet according to the working mode of the RQI and the RQI comprises:

determining that the first mapping relationship and the second mapping relationship satisfy the reflective QoS mapping, determining to use the first mapping relationship of the downlink data packet as the first mapping relationship of the uplink data packet, and determining to use the second mapping relationship of the downlink data packet as the second mapping relationship of the uplink data packet.

4. The method according to claim 1, wherein the RQI is a second preset value, the determining the first mapping relationship and the second mapping relationship of the uplink data packet according to the working mode of the RQI and the RQI comprises:

determining the first mapping relationship and the second mapping relationship of the uplink data packet according to a preset rule, wherein the preset rule comprises that the first mapping relationship and the second mapping relationship satisfy a default mapping relationship or that the first mapping relationship and the second mapping relationship remain unchanged, wherein the first mapping relationship and the second mapping relationship remain unchanged comprises determining to use the first mapping relationship of a preceding uplink data packet as the first mapping relationship of the uplink data packet, and determining to use the second mapping relationship of the preceding uplink data packet as the second mapping relationship of the uplink data packet.

5. The method according to claim 1, further comprising:

receiving a second RRC message transmitted by the network device, wherein the second RRC message comprises an indication field;

wherein the determining that the working mode of the RQI is the second working mode, comprises:

determining that the working mode of the RQI is the second working mode when the indication field is a second value.

6. A terminal device, comprising:

a processor, and a transceiver and a memory coupled to the processor;

the memory storing thereon instructions executable by the processor, wherein the processor is configured to execute the instructions to:

control the transceiver to receive a downlink data packet transmitted by a network device, wherein the downlink data packet comprises a reflective quality of service indication (RQI);

determine a working mode of the RQI, wherein the working mode of the RQI is used to determine the indication content of the RQI, the indication content comprises whether at least one of a first mapping relationship and a second mapping relationship satisfies a reflective quality of service (QoS) mapping, the first mapping relationship is a mapping relationship from an Internet Protocol (IP) flow to a QoS flow, the second mapping relationship is a mapping relationship from the QoS flow to a data radio bearer (DRB), wherein the first mapping relationship satisfies the reflective QoS mapping represents determining to use the first mapping relationship of the downlink data packet as the first mapping relationship of an uplink data packet, wherein the second mapping relationship satisfies the reflective QoS mapping represents determining to use the second mapping relationship of the downlink data packet as the second mapping relationship of the uplink data packet; wherein the processor is configured to: determine that the working mode of the RQI is a first working mode, wherein the first working mode is used to indicate that the RQI represents whether the first mapping relationship satisfies the reflective QoS mapping;

and determine the first mapping relationship and the second mapping relationship of the uplink data packet according to the working mode of the RQI and the RQI, wherein, the RQI is a first preset value, the processor is configured to: determine that the first mapping relationship satisfies the reflective QoS mapping, and determine to use the first mapping relationship of the downlink data packet as the first mapping relationship of the uplink data packet or, the RQI is a second preset value, the processor is configured to: determine the first mapping relationship of the uplink data packet according to a preset rule, wherein the preset rule comprises that the first mapping relationship satisfies a default mapping relationship or that the first mapping relationship remains unchanged, wherein the first mapping relationship remains unchanged comprises determining to use a first mapping relationship of a preceding uplink data packet of the uplink data packet as the first mapping relationship of the uplink data packet.

7. The terminal device according to claim 6, wherein the processor is further configured to control the transceiver to transmit the uplink data packet to the network device using a corresponding IP flow, QoS flow and DRB according to the first mapping relationship and the second mapping relationship of the uplink data packet.

8. The terminal device according to claim 6, wherein the processor is further configured to:
control the transceiver to receive a first radio resource control (RRC) message transmitted by the network device;
determine the second mapping relationship of the uplink data packet according to the first RRC message.

9. The terminal device according to claim 6, wherein the processor is further configured to:
control the transceiver to receive a second RRC message transmitted by the network device, wherein the second RRC message comprises an indication field; and
determine that the working mode of the RQI is the first working mode when the indication field is a first value.

10. A non-transitory computer readable storage medium, storing thereon computer instructions, when executed by a processor to cause a computer to implement the following steps:

receiving a downlink data packet transmitted by a network device, wherein the downlink data packet comprises a reflective quality of service indication (ROI);
determining a working mode of the RQI, wherein the working mode of the RQI is used to determine an indication content of the RQI, the indication content comprises whether at least one of a first mapping relationship and a second mapping relationship satisfies a reflective quality of service (QoS) mapping, the first mapping relationship is a mapping relationship from an Internet Protocol (IP) flow to a QoS flow, the second mapping relationship is a mapping relationship from the QoS flow to a data radio bearer (DRB), wherein the first mapping relationship satisfies the reflective QoS mapping represents determining to use the first mapping relationship of the downlink data packet as the first mapping relationship of an uplink data packet, wherein the second mapping relationship satisfies the reflective QoS mapping represents determining to use the second mapping relationship of the downlink data packet as the second mapping relationship of the uplink data packet; wherein the determining the working mode of the RQI comprises: determining that the working mode of the RQI is a second working mode, wherein the second working mode is used to indicate that the RQI represents whether the first mapping relationship and the second mapping relationship satisfy the reflective QoS mapping;
and
determining the first mapping relationship and the second mapping relationship of the uplink data packet according to the working mode of the RQI and the RQI.

* * * * *